United States Patent [19]

De Rooij et al.

[11] 3,879,380

[45] Apr. 22, 1975

[54] PROCESS FOR RECOVERY OF LACTAM

[75] Inventors: Abraham H. De Rooij, Geleen; Reijer Goettsch, Beek, both of Netherlands

[73] Assignee: Stamicarbon, B.V., Geleen, Netherlands

[22] Filed: Dec. 11, 1972

[21] Appl. No.: 313,638

[30] Foreign Application Priority Data

Dec. 11, 1971 Netherlands.................... 7117035

[52] U.S. Cl. ................ 260/239.3 A; 260/293.86; 260/326.5 FN
[51] Int. Cl. ........................................ C07d 41/06
[58] Field of Search ............................ 260/239.3 A

[56] References Cited
UNITED STATES PATENTS

| | | | |
|---|---|---|---|
| 2,249,177 | 7/1941 | Schlack.......................... | 260/239.3 A |
| 2,351,381 | 6/1944 | Wiest............................. | 260/239.3 A |
| 2,723,266 | 11/1955 | Lincoln et al................. | 260/239.3 A |
| 2,737,511 | 3/1956 | Cohn............................. | 260/239.3 A |
| 2,993,889 | 7/1961 | Muytjens et al............... | 260/239.3 A |
| 3,336,298 | 8/1967 | De Rooij et al............... | 260/239.3 A |

*Primary Examiner*—Henry R. Jiles
*Assistant Examiner*—Robert T. Bond
*Attorney, Agent, or Firm*—Cushman, Darby & Cushman

[57] ABSTRACT

A process for recovering lactams from a mixture of one or more lactams and sulphuric acid is disclosed, wherein the sulphuric acid is neutralized with ammonia or an ammonium salt to ammonium hydrogen sulfate in the presence of a lactam solvent. The neutralization produces a melt of ammonium hydrogen sulfate and a solution of lactam in the organic solvent, and the melt is readily separated from the solution. The lactam can then be recovered from the organic solvent.

The process allows the lactam to be recovered in good yield without producing, as by-product, ammonium sulfate.

7 Claims, 1 Drawing Figure

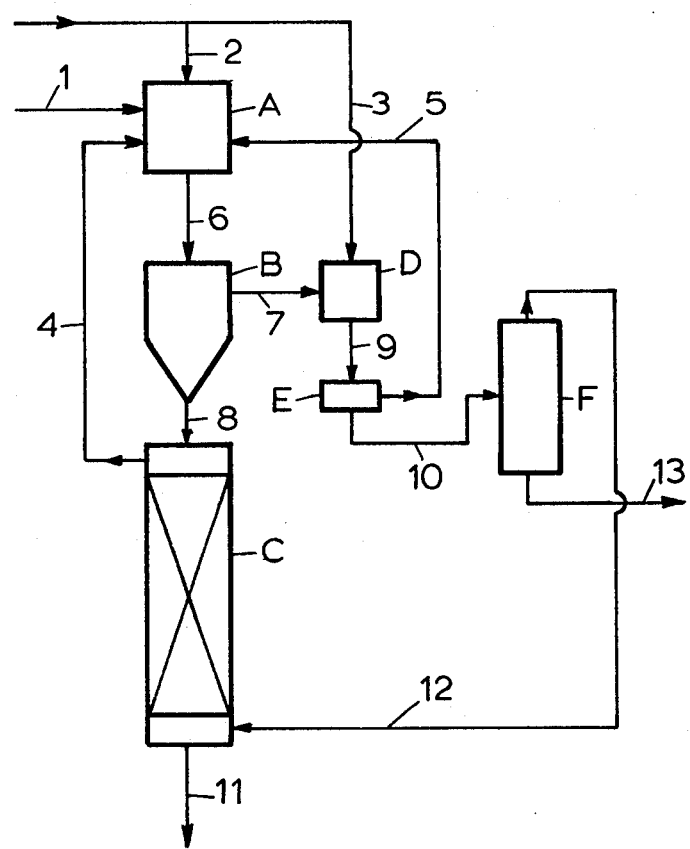

PROCESS FOR RECOVERY OF LACTAM

BACKGROUND OF THE INVENTION

The present invention relates to the preparation of lactams, such as ε-caprolactam, from the corresponding ketoximes, especially the recovery of the lactams so produced from the reaction medium.

Lactams are obtained from alicyclic oximes by an intramolecular rearrangement known as the Beckmann rearrangement, wherein rearrangement takes place in, and is catalyzed by, a highly acid medium. Suitable highly acid mediums include, in addition to sulphuric acid, other acid media such as phosphoric acid, a mixture of acetic acid and acetic anhydride, a melt of ammonium hydrogen sulfate, and sulphur trioxide in liquid sulphur dioxide. However, in commercial practice in the rearrangement of cyclohexanone oxime to ε-caprolactam, the most important of the lactams now being produced on an industrial basis, 6% by weight oleum is generally used as the acid medium, in a ratio of 1 mole of dry oxime to 1.5 moles of sulphuric acid. Any traces of moisture present in the cyclohexanone oxime which is to be rearranged are removed by the free $SO_3$ in the oleum. Rearrangement in the oleum medium takes place at about 125°C to produce ε-caprolactam in a fast, continuous manner with very high process efficiencies. Also, the rearrangement is conducted on a commercial scale at much lower temperatures in a medium of $SO_3$ dissolved in liquid sulphur dioxide, usually at a molar ratio of oxime to $SO_3$ of 1:1.

This prior art process has a decided disadvantage in that the process involves the coproduction of ammonium sulfate. In order to be able to remove the lactam product from the sulphuric acid reaction medium, if necessary after evaporation of sulphur dioxide, the prior art usually neutralized the reaction medium with ammonia water to a pH value of about 4.5, to form two layers, with the upper layer consisting mainly of lactam floating on the ammonium sulfate solution, containing about 40% by weight of ammonium sulfate and only slight amounts of lactam. The two layers can be separated in a relatively simple manner, and lactam can be recovered from each of the layers by extraction.

In processes for recovering lactam of the above-described type, the sulphuric acid or oleum used as the acid medium for the rearrangement is fully converted into ammonium fulfate, resulting in about 1.2 to about 1.9 tons of by-product ammonium sulfate being produced per ton of ε-caprolactam product.

Ammonium sulfate is used as a fertilizer in tropical and subtropical regions, but the prospects of profitable sales are not encouraging as a result of reduced sales prices, particularly when considered in connection with the high transportation costs involved in transporting ammonium sulfate to tropical or subtropical regions from production locations in more temperate zones. As a result of the discouraging sales picture for ammonium sulfate, which has long been recognized, the prior art has sought methods to avoid the coproduction of ammonium sulfate in the recovery of lactam from a mixture of lactam and sulphuric acid.

According to one prior art method, the mixture of lactam and sulphuric acid is not neutralized, but is instead diluted with water, whereupon the lactam is extracted with a water-immiscible extracting agent. The resulting aqueous solution of sulphuric acid, which is substantially free of lactam, can again be used, after concentration, in the rearrangement of oximes to lactams. Chloroform is strongly preferred as the extracting agent, and in order to be able to efficiently extract with chloroform, U.S. Pat. No. 2,737,511 teaches that the mixture of lactam and sulphuric acid must first be diluted until a sulphuric acid content of 10 – 20% by weight, preferably 12 – 16% by weight, based on the amount of water present, is obtained. Coproduction of the undesired ammonium sulfate is avoided by such a process, but this process has the drawback in that it involves the production of highly diluted waste sulphuric acid. The concentration of this highly diluted waste sulphuric acid to the concentration required for the Beckmann rearrangement involves relatively high costs. It is impossible to directly convert such diluted waste sulphuric acid, e.g., a 15 weight percent waste sulphuric acid, into the 6 weight percent oleum used for the rearrangement of oximes to lactams. Evaporative concentration produces sulphuric acid having a concentration of no more than 98% by weight, which can be converted, by absorption of sulphur trioxide, into 6 weight percent oleum. However, using this approach much more oleum is produced than is required for the Beckmann rearrangement so that the by-product of the process is now 6 weight percent oleum instead of ammonium sulfate.

If such oleum coproduction is undesired, the waste acid may be decomposed into $SO_2$, $O_2$ and $H_2O$, and the $SO_2$ may be subsequently utilized in a sulphuric acid plant. The decomposition of waste acids can be accomplished by spraying the acid into a flame, such as a natural gas flame. In such instances, it is preferred that the acid sprayed into the flame is not excessively diluted, since all of the water in the acid solution must be evaporated in the flame.

Considering that the usual Beckmann rearrangement mixture contains 1.5 moles of sulphuric acid per mole of ε-caprolactam, and that it is necessary for this sulphuric acid to be diluted to about 15 weight percent in order to make the lactam extraction possible, it will be appreciated that about 46 moles of water are added per mole of caprolactam. Thus, the decomposition of the diluted waste sulphuric acid into gaseous $SO_2$, $O_2$ and $H_2O$ requires the evaporation of 30 moles of water per mole of sulphuric acid, which results in high combustion costs.

In order to reduce the amount of water which must be evaporated in the decomposition of the waste acid remaining after lactam extraction, the co-pending De Rooij application, Ser. No. 249,642, filed May 2, 1972, proposes that the mixture of lactam and sulphuric acid which is to be extracted be partially neutralized with ammonia water, wherein the amount of ammonia added is such that the molar ratio $$[(NH_4)_2SO_4/(NH_4)_2SO_4 + H_2SO_4]$$

in the solution which is to be extracted has a value of 0.30:1 to 0.65:1. The water content of the solution which is to be extracted is limited to not more than 10 moles of water per mole of bound and free sulphur trioxide originally present in the lactam-containing rearrangement mixture.

The process of this co-pending application produces, after extraction of the lactam, concentrated solutions containing about 50 – 65% by weight of ammonium hydrogen sulfate, together with, in some instances, small amounts of free sulphuric acid or ammonium sulfate, especially in those cases where the molar ratio $$[(NH_4)_2SO_4/(NH_4)_2SO_4 + H_2SO_4]$$

is lower or higher than 0.5:1. Concentrated solutions of this type, however, still contain too much water to yield upon combustion a $SO_2$-containing gas mixture which is suitable, after part of the water vapor in the mixture has been condensed by cooling, for being processed into oleum without further drying. Processing into oleum is possible if the concentrated solution which is combusted is further concentrated by evaporation, or if a significant amount of water is removed, for instance, by the action of a drying agent, from the sulphur dioxide-containing gas mixture obtained by combustion of the concentrated solution.

SUMMARY OF THE INVENTION

The process of the present invention is directed to recovering one or more lactams from a mixture of such lactam or lactams and sulphuric acid. The process involves neutralizing the sulphuric acid in the mixture at a temperature of at least about 110°C in the presence of an inert organic solvent for the lactam. The sulphuric acid is neutralized with ammonia, ammonium sulfate, and/or dry ammonium hydrogen sulfate to ammonium hydrogen sulfate, which is obtained as a melt. The lactam dissolves in the organic solvent, and the lactam-containing organic solvent is separated, by simple phase separation, from the ammonium hydrogen sulfate melt. The lactam-containing organic solvent also contains free sulphuric acid, and this free sulphuric acid is neutralized to convert the free sulphuric acid to solid ammonium sulfate or triammonium hydrogen sulfate. These solid ammonium salts are readily separated from the solution and the salts so separated may be used to neutralize the sulphuric acid in the starting mixture. The lactam can be separated from the organic solvent by distillation or extraction. The solvent which has been substantially freed of lactam may in turn be used to extract any lactam remaining in the ammonium hydrogen sulfate melt, thereby producing, in addition to the lactam, a discharge of a substantially lactam-free melt of ammonium hydrogen sulfate.

The ammonium hydrogen sulfate may be subjected to conventional recovery treatment, wherein $SO_3$ or $SO_2$ are recovered.

DESCRIPTION OF THE INVENTION

The present invention is directed to a process for recoverying lactam from a mixture of one or more lactams with sulphuric acid, sulphur trioxide, or mixtures thereof. The process of the present invention involves the preparation of a melt of ammonium hydrogen sulfate from which $SO_2$ and/or $SO_3$ may be recovered, without requiring concentration of the solution which is to be combusted and without requiring drying of the gas mixture obtained from the solution combustion.

The sulphuric acid and/or the sulphur trioxide present in the mixture of lactam and sulphuric acid and/or sulphur trioxide, which mixture is normally obtained from the Beckmann rearrangement, possibly after evaporation of liquid $SO_2$ if $SO_2$ is used as a solvent in the rearrangement, is neutralized to produce a lactam-containing melt of ammonium hydrogen sulfate, with at least one neutralizing agent which may be ammonia, ammonium sulfate, or triammonium hydrogen sulfate or mixtures thereof. Prior to the neutralization, water is added to the rearrangement mixture in order to convert free $SO_3$ into sulphuric acid. That is, water is added in an amount of one mole of water to every mole of free $SO_3$. The lactam is extracted from the melt by the use of an organic lactam solvent.

It has been previously proposed in the extraction of lactams that the mixture of lactam and sulphuric acid be fully neutralized with gaseous or liquid ammonia and thereafter the lactam is separated from the solid ammonium sulfate by extraction of the neutralized mass. Contrary to this prior art process, in the process of the present invention the sulphuric acid an/or sulphur trioxide in the lactam-containing rearrangement mixture are not completely neutralized by only about half neutralized, with formation of a melt of ammonium hydrogen sulfate. The lactam is then removed from this melt by extraction with an organic solvent.

In the step of neutralizing the sulphuric acid and/or sulphur trioxide present in the rearrangement mixture, it is not necessary to exactly neutralize these materials to ammonium hydrogensulfate. In other words, the molar ratio does not have to correspond exactly to the formula $$\eta = [(NH_4)_2SO_4/(NH_4)_2SO_4 + H_2SO_4] = (0.5/1)$$

Relatively small deviations from this molar ratio are possible, and the lactam will generally be extracted from a melt wherein the molar ratio $\eta$ varies from 0.40 : 1 to 0.55 : 1. As used hereinafter, the term 'ammonium hydrogen sulfate melt' refers to melts not only having a molar ratio of $\eta = 0.5 : 1$, but also those compounds wherein the molar ratio varies from a lower limit of $\eta = 0.40 : 1$ to an upper limit of $0.55 : 1$.

In order for the mass to be kept in a molten condition during the neutralization of the sulphuric acid and/or sulphur trioxide to ammonium hydrogen sulfate, the neutralization must be at a temperature will above the melting point of ammonium hydrogen sulfate (147°C), and such elevated temperatures result in substantial losses through lactam decomposition. In the process of the present invention, however, the molten condition during neutralization may be maintained by conducting the neutralization at a temperature which only slightly exceeds the melting point of ammonium hydrogen sulfate, and by conducting the neutralization in the presence of such am amount of organic solvent, or extracting agent, for the lactam that the lactam completely dissolves in such solvent. Two phases will then be formed in the neutralization step, an organic phase consisting mainly of the solvent or extracting agent containing dissolved lactam, and an inorganic phase consisting mainly of the melt of ammonium hydrogen sulfate.

The separation of the organic compounds from the inorganic compounds through formation of the two phases is not complete, as the organic phase will invariably contain free sulphuric acid while the inorganic phase will still contain small amounts of lactam. After the phases have been separated, they can each be further processed in a suitable manner. For instance, the sulphuric acid in the organic phase may be subjected to an additional neutralization step, with removal of the ammonium salt formed during the neutralization from the organic phase. The inorganic phase may be subjected to a second extraction in order to recover the lactam which is dissolved in the melt.

The lactams which are produced from the corresponding oximes, and which are recovered by the process of the present invention, are generally lactams having from 4 – 12 carbon atoms, with ε-caprolactam being decidedly preferred. Other lactams which can be recovered by the process of the present invention include, for instance, butyrolactam, valerolactam, oenantholactam and laurinolactam.

The lactam extracting agent may be any organic solvent for the lactam which is inert to sulphuric acid at a temperature of 150°C, for instance, xylene, 1,3,5-trimethyl benzene, α-chlorotoluene and other chlorinated hydrocarbons. In general, aromatic hydrocarbons, especially those aromatic hydrocarbons having 6 – 10 carbon atoms, including benzene and toluene, may be used to extract lactams from a melt wherein the acidity is not too great, whereas for melts which are still relatively acid, chloroform and other chlorinated hydrocarbons, especially chlorinated alkanes of 1 – 3 carbon atoms, such as 1,2-dichloroethane or 1,1,2,2-tetrachloroethane, are preferred. In general, preference is given to chlorinated hydrocarbons such as 1,2-dichloroethane or 1,1,2,2-tetrachloroethane.

Since the process of the present invention essentially relates to the extraction of lactam from a melt of ammonium hydrogen sulfate, the extraction will theoretically have to be conducted at a temperature of at least 147°C, which for practical reasons means that the extraction temperature will be kept a few degrees above that temperature. However, if the melt should contain a small amount of free sulphuric acid, that is, in the case of molar ratios of $\eta$ being lower than 0.5:1, the temperature may be considerably lower, for instance, as low as 110° – 120°C, as a result of which lactam decomposition during the extraction can be reduced. A disadvantage of this approach, however, is that much larger quantities of the organic solvent or extracting agent must be used, as it is much more difficult for the lactam to be extracted from an ammonium hydrogen sulfate melt which contains free sulphuric acid.

Temperatures significantly higher than 147°C may be used for the extraction, but the lactam losses due to decomposition may be quite significant. For this reason, it is preferred to conduct the extraction at a temperature no greater than about 160°C. The extraction may be conveniently accomplished under ambient pressures in some instances, but in cases where the temperature of the ammonium hydrogen sulfate melt which is to be extracted exceeds that of the boiling point of the solvent, the extraction must be carried out under pressure. Pressures of 1 – 3 atmospheres are preferred, although higher pressures, e.g., as high as 20 atmospheres, may be used without adverse effect other than increased cost.

The molar ratio of the organic solvent to the lactam will normally be at least 3:1 in order to insure adequate extraction. There is no limit to this molar ratio of solvent:lactam, but it will be appreciated that for practical reasons, this ratio will generally be no greater than about 40:1.

After the lactam has been extracted from the melt, the remaining melt of ammonium hydrogen sulfate may be decomposed into $N_2$, $H_2O$ and $SO_2$ through combustion, such as in a natural gas flame. The resulting gas mixture may be used as a feed stock in a sulphuric acid plant for the preparation of oleum which can then be used in the rearrangement of oxime into lactam.

Instead of recovering $SO_2$ by combustion, it is also possible to subject the melt to pyrolysis to recover $SO_3$ and $NH_3$. The melt may first be converted with the aid of a suitable metal oxide, such as ZnO, into ammonia, water and metal sulfate, e.g., zinc sulfate, at a medium-high temperature, e.g., 300° – 500°C, and thereafter the metal sulfate can be decomposed into the metal oxide and sulphur trioxide at high temperatures, e.g., 850°–1,200°C. Thus, sulphur trioxide is directly recovered, and this sulphur trioxide may be used in the Beckmann rearrangement. This recovery of sulphur trioxide is particularly attractive if the Beckmann rearrangement of oximes takes place using liquid sulphur dioxide as a reaction solvent and sulphur trioxide as the acid reaction agent. In such a Beckmann rearrangement, the sulphur dioxide is normally evaporated off after the rearrangement, and the mixture of lactam and sulphur trioxide remaining is converted with water into a mixture of lactam and sulphuric acid, which mixture can then be subjected to the process of the present invention to recover lactam therefrom.

From the above, it will be appreciated that the present process allows lactam to be recovered from Beckmann rearrangement mixtures without the undesired coproduction of ammonium sulfate.

DESCRIPTION OF THE DRAWING

The accompanying drawing is a schematic flow diagram of one embodiment of the process of the present invention. The starting mixture of lactam and sulphuric acid (such as that obtained from a Beckmann rearrangement) is introduced via line 1 into neutralization vessel A, wherein the mixture is mixed with an organic solvent for the lactam supplied through line 4. The rearrangement mixture is neutralized in neutralization vessel A with ammonia introduced via line 2 and ammonium sulfate salt which is introduced via line 5. The neutralization vessel is generally maintained at a temperature of about 147° to 160°C, preferably 150° to 155°C, and is conveniently operated at atmospheric pressure, although higher and lower pressures may be used if desired. In particular, pressures in the range of 1 to 15 atmospheres may be conveniently used, depending upon the particular solvent which is used. There is no special ratio between the lactam and the sulphuric acid introduced through line 1, as these ratios are generally controlled by the rearrangement conditions, but normally the molar ratio of lactam : sulphuric acid will be from about 1 : 1.4 to 1 : 1.6. The solvent which is introduced into neutralization vessel A through line 4 will normally be present in an amount of from 2 to 9 times, preferably 3 to 4 times, based on the weight of lactam present. The amount of ammonia introduced through line 2 is normally about 0.3 to 0.7 moles, preferably 0.33 to 0.40 moles, per mole of sulphuric acid introduced through line 1. The amount of ammonium sulfate $((NH_4)_2SO_4)$ which is introduced through line 5 is normally in an amount of about 10 to 40 mole percent, preferably about 25 to 33 mole percent, based on the moles of sulphuric acid introduced into the mixing vessel A. In any event, the amount of ammonia and ammonium sulfate combined which is introduced into mixing vessel A will normally be from 80 to 100% of the stoichiometric amount required to convert the sulphuric acid into ammonium hydrogen sulfate.

The contents of the neutralization vessel A are introduced through line 6 into separator B, wherein two layers form and are separated. The bottom layer is a melt of ammonium hydrogen sulfate containing about 1% by weight of dissolved lactam, and the upper layer consists of the organic solvent loaded with lactam and sulphuric acid. The separator B is normally maintained at a temperature and at a pressure about that of neutralization vessel A.

The bottom layer from separator B is introduced via line 8 into extraction column C, wherein the bottom layer (the ammonium hydrogen sulfate melt) is subjected to countercurrent extraction with organic solvent supplied through line 12 and discharged through line 4. The extraction column is generally maintained at about the temperature and pressure of neutralization vessel A. An ammonium hydrogen sulfate melt which is substantially free of lactam is discharged through line 11 for further processing.

The upper layer formed in separator B is introduced via line 7 into after-neutralization vessel D wherein the sulphuric acid present in the upper layer is neutralized. The sulphuric acid may be converted with ammonia, supplied through line 3, into solid ammonium sulfate or into the double salt triammonium hydrogen sulfate ($(NH_4)_3H(SO_4)_2$). The sulphuric acid may also be neutralized with ammonium sulfate, in which case the double salt is generally formed. The after-neutralization vessel D is normally maintained at a temperature much lower than the temperature in neutralization vessel A. The temperature will be kept, e.g., within a range of 20°–60°C. The ammonia is generally introduced into the after-neutralization vessel D in an amount of about 0.7 to 0.3 moles, preferably 0.67 to 0.60 moles, based on the moles of sulphuric acid passing through line 1. If ammonium sulfate is used, as the neutralizing agent, it is normally used in an amount of about 3 moles, based on the moles of sulphuric acid present.

A suspension of the solid ammonium salt, either ammonium sulfate or triammonium hydrogen sulfate or mixtures thereof, in the solvent which is loaded with lactam, flows through line 9 into solid-liquid separator E. The ammonium salt crystals are separated from the lactam-loaded solvent in solid-liquid separator E, conveniently by filtration, although other means of separating solids from liquids can obviously be used, such as by use of a centrifuge. The solid ammonium salt which is separated is introduced into the neutralization vessel A by way of line 5.

The mother liquor from the solid-liquid separator E, which is solvent loaded with lactam, flows from separator E through line 10 to evaporator F, wherein the solvent is separated from the dissolved lactam by distillation at a temperature of 50° to 150°C, and at a pressure of 0.1 to 1 atmospheres. It will be readily appreciated by those in the art that the particular distillation conditions will depend upon the choice of the particular solvent.

The evaporated solvent is condensed and then lead through line 12 into extraction column C. The lactam recovered in evaporator F is removed from the system through line 13, for additional purification, if required, using known techniques.

Instead of using distillation for separating solvent from the dissolved lactam, it is also possible to extract the lactam from the solvent by use of water in an extraction column. Normally the amount of water used will be about 2 to 4 parts by weight, based on the weight of the dissolved lactam, although greater or lesser amounts of water may be used as desired. The extraction is conveniently conducted at temperatures of 20° to 50°C. The resulting solution of raw lactam and water may be further purified, using known techniques, and the solvent which has been freed of lactam can again be utilized for the extraction of the ammonium hydrogen sulfate in extraction column C, in the same manner as if an evaporator is used.

EXAMPLES OF THE INVENTION

The invention will be understood more readily by reference to the following examples; however, these examples are intended to illustrate the invention and are not to be construed to limit the scope of the invention.

Both of the following examples relate to the removal of $\epsilon$-caprolactam from a mixture of that lactam and sulphuric acid, the mixture containing 1,000 kg of lactam. The organic solvent which was used was 1,1,2,2-tetrachloroethane. In the first example, the upper phase formed in separator B contained 10% by weight of sulphuric acid and 22% by weight of lactam, with the sulphuric acid neutralized to ammonium sulfate in the after-neutralization vessel D. In the second example a greater amount of solvent was used, and the upper layer formed in separator B contained 9% by weight of lactam and 2.6% by weight of sulphuric acid in the tetrachloroethane. The sulphuric acid was neutralized to the double salt $((NH_4)_3H(SO_4)_2)$ in the after-neutralization vessel D.

EXAMPLE 1

In this example, the equipment schematically represented in the accompanyinng drawing was used, with the process conducted at atmospheric pressure. The neutralization vessel A was supplied with the rearrangement mixture of 1,000 kg of $\epsilon$-caprolactam and 1,301 kg of sulphuric acid through line 1, withh 75 kg of ammonia through line 2, and with 584 kg of ammonium sulfate through line 5. At the same time, a solution of 10 kg of lactam in 2,973 kg of tetrachloroethane ($C_2H_2Cl_4$) was introduced through line 4. The temperature of the neutralization vessel was maintained at 150°C.

A neutralized mixture flowed from neutralization vessel A to separator B via line 6. In separator B, maintained at a temperature of 150°C, two layers formed.

The upper layer formed in separator B contained 2,973 kg of tetrachloroethane, 434 kg of sulphuric acid, and 940 kg of lactam. This upper layer was introduced via line 7 into after-neutralizer vessel D, wherein it was neutralized at a temperature of 50°C with 150 kg of ammonia. The neutralized mixture from after-neutralizer vessel D was subjected to filtration in solid-liquid separator E, with removal of 584 kg of ammonium sulfate, which was returned to the neutralization vessel A via line 5. A solution of 940 kg of lactam in 2,973 kg of tetrachloroethane was obtained as mother liquor from the solid-liquid separator E. The lactam was recovered from this mother liquor by evaporation of the solvent in evaporator F at a temperature of 80°C (equivalent results could be obtained by extracting the mother liquor with water).

The bottom layer from separator B was a melt of ammonium hydrogen sulfate, containing a small amount of lactam. This ammonium hydrogen sulfate melt was extracted at a temperature of 150°C in extraction column C with 2,973 kg of tetrachloroethane supplied from evaporator F via line 12. A lactam-free melt of ammonium hydrogen sulfate was discharged through line 11.

EXAMPLE 2

Example 1 was repeated, with 8,930 kg of solvent circulated in lines 12 and 4. 158 kg of ammonia were introduced into neutralization vessel A via line 2. 327 kg of the double salt $(NH_4)_3H(SO_4)_2)$ were introduced into the neutralization vessel A via line 5. 1,526 kg of ammonium hydrogen sulfate melt were discharged from extraction column C through line 11. The mother liquor from solid-liquid extractor E was a solution of 940 kg of ε-caprolactam dissolved in 8,930 kg of tetrachloroethane.

What is claimed is:

1. A process for the recovery of caprolactam from a mixture of caprolactam and sulphuric acid, said process comprising neutralizing said sulphuric acid in said mixture to ammonium hydrogen sulfate at a temperature of at least about 110°C in the presence of an amount of at least one organic solvent for said lactam sufficient to dissolve said lactam, said solvent being inert to sulphuric acid at a temperature of 150°C, with at least one neutralizing agent selected from the group consisting of ammonia, ammonium sulfate, and triammonium hydrogen sulfate, to produce a melt of ammonium hydrogen sulfate, wherein the amount of said neutralizing agent is such that the molar ratio $$[(NH_4)_2SO_4 / ((NH_4)_2SO_4 + H_2SO_4)]$$

is between 0.4:1 and 0.55:1 and a solution of lactam in said organic solvent, said solution also containing free sulphuric acid, and recovering the lactam from said solution.

2. Process according to claim 1, wherein the lactam is recovered from said solution by neutralizing said solution at a temperature of about 20° to about 60°C with said neutralizing agent to convert said free sulphuric acid to solid ammonium sulfate or triammonium hydrogen sulfate and separating the lactam in said solution from said organic solvent.

3. Process according to claim 1 wherein lactam is extracted from said melt of ammonium hydrogen sulfate at a temperature of about 150°C.

4. Process according to claim 3, wherein the molar ratio of ε-caprolactam to sulphuric acid is about 1 : 1.4–1.6.

5. Process according to claim 1, wherein the lactam is extracted from said melt of ammonium hydrogen sulfate at a temperature of 110°–150°C.

6. Process according to claim 1, including the additional step of thermally decomposing the substantially lactam-free melt of ammonium hydrogen sulfate with recovery of $SO_2$ and/or $SO_3$.

7. Process according to claim 1, wherein said molar ratio is about 0.5 : 1.

* * * * *